: 2,809,879
: Patented Oct. 15, 1957

2,809,879

STERILIZATION OF CRYSTALLINE POWDERS USING EPOXIDE

Joseph N. Masci, Metuchen, N. J., assignor to Johnson & Johnson, a corporation of New Jersey No Drawing. Application February 27, 1956, Serial No. 567,753

8 Claims. (Cl. 21—58)

This invention relates to the sterilization of free-flowing, crystalline powders, and more particularly to the sterilization of talc of a particle size in the range of about 1 to 200 microns by treatment with at least 0.5% of a lower epoxide and at least 0.05% of water until the powder is sterile; and preferably the resulting, sterile, powder is free-flowing, devoid of epoxide as such, and the maximum amount of combined epoxide therein is 5% if the maximum amount of water therein is 1% and this maximum is 1.5% if the maximum amount of water is 1.5%.

Finely divided, crystalline powders such as talc and the like are well known and have achieved remarkable commercial success. For some purposes, it is desirable that the powder be sterile, and yet retain its free-flowing characteristics. The usual sterilization procedure of applying steam under pressure suffers from the drawback of causing caking of the powder; i. e., reducing or removing the desired free-flowing property thereof. It is also difficult to apply this technique in the manufacturing of packaged powder. The art is confronted by the problem of providing sterile, free-flowing, crystalline powders in a reliable and economic manner.

The discoveries associated with the invention relating to solution of the above problems and the objects achieved in accordance with the invention as set forth herein include: the provision of a method for obtaining sterile, free-flowing, crystalline powders which powders are susceptible to undesirable caking upon contact with liquids, which method comprises treating the finely divided powder with at least 0.5% of a lower epoxide of 2 to 3 carbon atoms and at least 0.05% of water at a temperature in the range of about 70 to 120° F. and a time in the range of about 5 hours to 15 days until the powder is sterile, the resulting powder being free of epoxide as such and the maximum amount of treating materials present therein being 5% of epoxide in combined form if the maximum amount of water is 1% including both combined and free water, and 1.5% of epoxide if the maximum amount of water is 1.5%, the resulting sterile powder being free-flowing; the provision of such a method wherein the powder is talc of a particle size in the range of about 1 to 200 microns and the epoxide is propylene oxide; the provision of such a method carried out at 100° F. for 14 hours wherein the maximum amount of water in the product is 0.2% and the maximum amount of combined propylene oxide is 1.5%; the provision of such a method wherein the propylene oxide is added as a liquid; the provision of such a method carried out in an isolated zone impermeable to microorganisms; and other objects which will be apparent as details or embodiments of the invention are set forth hereinafter.

In order to facilitate a clear understanding of the invention, the following preferred specific embodiments are described in detail.

*Example 1*

A powder is prepared having the following composition and characteristics:

95% by weight talc (potassium magnesium aluminum silicate)
    Particle size:
        99.95% through 100 mesh
        98.7% through 200 mesh
        88.6% through 325 mesh
        (U. S. Sieve Series)
5% solid boric acid
    Particle size:
        99.9% through 100 mesh
        94.8% through 200 mesh
        78.9% through 325 mesh, and
0.18% perfume.

This powder is throughly mixed, and inoculated with an aqueous suspension of *Bacillus subtilis* in an amount such that the powder contains the desired amount of water.

PART A

A series of 4 oz. size conventional powder cans are loaded with powder containing 0.5% water and the tops (the perforated cap being closed) are sealed with adhesive tape. Some of these cans are treated with liquid propylene oxide (e. g., by injection by means of a hypodermic needle prior to sealing). The cans are stored and following the storage period, they are opened and tested for odor (presence of free or unreacted epoxide), free-flowing properties, and sterility (the latter being according to the method set forth in the Pharmacopoeia of the United States of America, Fourteenth Revision (1950), pages 758–762).

All of the powders of this series were free-flowing, and without cakes or lumps at the end of the tests. Twenty cans containing the powder with 0.5% water were treated with 1% by weight propylene oxide, and 10 of them stored at 100° F. and the other 10 at 120° F. Two additional cans (controls) containing 0.5% water, but not treated with propylene oxide were also stored at 120° F. Sterility determinations were made at the end of one day's, 4 days', 7 days', 11 days' and 15 days' storage time. All of the test groups demonstrated complete sterility. The powders of this series which were stored for at least 7 days were free of epoxide odor.

All of the controls (not treated with propylene oxide) for this series were non-sterile.

PART B

The above series of runs were repeated with powder containing 1% of water and similar results were obtained.

*Example 2*

The procedure of Example 1 is repeated using 1½ ounce size cans, both the water and the propylene oxide being injected into the can after the powder is placed therein, the amount of propylene oxide being 5% based on the weight of the talc. Seven cans are stored at 70° F., 7 cans at 100° F., and 7 cans at 120° F., for two weeks. Three of the untreated cans were tested for moisture content and this was found to be 0.06% by weight in each case (Karl Fischer method). At the end of the two-week period all the powders were found to be free of epoxide odor, free-flowing and without cakes or lumps, and all were sterile, except in the 70° F. group, 6 cans were sterile but one showed an indication of non-sterility.

The corresponding controls were non-sterile.

Example 3

The procedure of Example 1 is repeated, using 5% propylene oxide. Two untreated cans tested for moisture showed 0.2%. Six of the epoxide treated cans are stored at 70° F., 6 at 100° F. and 6 at 120° F., for two weeks. All of the resulting treated powders were found to be free of epoxide odor, free-flowing and without cakes or lumps, and sterile. The corresponding controls were non-sterile.

Example 4

The above runs are repeated using well-sealed pressure bottles as containers, and in a separate series for each the following water concentrations:

0.05% by weight
0.25% by weight
0.50% by weight
1.00% by weight
1.50% by weight
2.00% by weight Propylene oxide concentrations for each of the above series are:

1.0%
1.5%
3.0%
5.0%

Each sample is stored at 10° F. and some are examined at the end of 40 hours and others at the end of 14 days' storage.

For 40 hours' storage at 100° F. runs, some odor of propylene oxide is still present; however, the odor is absent at the end of the 14 day storage at 100° F. indicating completion of chemical reaction of the epoxide in the system.

As to flow properties, all the samples treated with 1% or less of water and with 1 to 5% of propylene oxide were completely free-flowing. The samples treated with 1.5% water and with 1% or 1.5% propylene oxide also were completely free-flowing. However, the samples treated with 1.5% water and 2 or 3 or 5% propylene oxide were not free-flowing (under conditions where the indicated amount of propylene oxide is retained in combined form in the final product). These powders would not flow through the small opening of the order of 1-3 mm. diameter in conventional talcum powder cans, whereas the free-flowing powder does flow through such holes when the can is held upside down, tipped at a slight angle of about 30° from the vertical, and gently shaken.

Example 5

The procedure of the above examples is repeated except using a starting powder containing:

99.5% talc
0.4% sodium sesquicitrate
0.15% perfume and comparable results are obtained.

Example 6

The above procedures are repeated using suitable pressure-resistant containers and ethylene oxide in place of the propylene oxide, and comparable results are obtained. However, from the economical viewpoint, propylene oxide is preferred inasmuch as it can be used under ordinary conditions without special equipment.

Example 7

The procedure of the above examples is repeated with talc alone, and comparable results are obtained.

The foregoing examples clearly show that powder is sterilized by means of the epoxide in accordance with the invention and that it is also free-flowing if the maximum amount of residual epoxide is 5% if the amount of water is 1%, or if the maximum amount of the epoxide is 1.5% if the amount of water is 1.5%.

Comparable results to the foregoing are achieved with various modifications thereof, including the following. The treatment or storage temperature may be from 70 to 120° F. or above if the material treated is stable at the higher temperature. The storage time may be 5 hours to 15 days or more. The crystalline powder is preferably inorganic, and of a particle size in the range of about 1 to 200 microns. Talc is a preferred powder. However, other powders such as boric acid, bentonite, kaolin and the like may be sterilized in accordance with the invention.

For commercial purposes, it is preferred to use powder containers with appropriate closures to prevent recontamination; and also to employ a sufficient excess of the epoxide to ensure the desired sterility. Such an excess may compensate for any losses through leakage during the sterilization, but of course the amount used should be low enough so that there is no free epoxide present at the time of use of the powder.

The amounts of the treating agents, water and epoxide, used should be sufficient to achieve the desired sterilization under the treatment conditions, and the maximum amounts thereof should be low enough so that the final product is free-flowing and devoid of free epoxide.

The combined epoxide remaining in the powder may be present as the corresponding glycol or derivative, the presence of which material is not objectionable.

This application is a continuation-in-part of application Serial No. 302,005, filed July 31, 1952, now abandoned.

In view of the foregoing disclosures, variations or modifications thereof will be apparent, and it is intended to include within the invention all such variations and modifications except as do not come within the scope of the appended claims.

I claim:

1. A method of sterilizing a free-flowing, crystalline powder of a particle size in the range of about 1 to 200 microns which powder is susceptible to undesirable caking upon contact with liquids, which method comprises treating said powder with at least 0.5% of a lower epoxide of 2 to 3 carbon atoms and at least 0.05% of water, based on the weight of the powder, at a temperature in the range of about 70 to 120° F. and a time in the range of about 5 hours to 15 days until said powder is sterile, and devoid of free epoxide, the maximum amount of the treating materials remaining in the powder at the end of the treatment being 5% of the epoxide in combined form if the maximum amount of water including both free and combined water is 1%, and 1.5% of the epoxide if the maximum amount of the water is 1.5%, whereby a free-flowing, sterile powder of substantially similar particle size is obtained.

2. A method of claim 1 wherein the powder is talc and the epoxide is propylene oxide.

3. A method of claim 2 wherein the treatment is at 100° F. for 14 hours and at the end thereof the amount of water is 0.2% and the amount of combined propylene oxide is 1.5%.

4. A method of claim 3 wherein the propylene oxide is added as a liquid.

5. A method of claim 4 carried out in an isolated zone impermeable to microorganisms.

6. A method of claim 1 for sterilizing a free-flowing, crystalline talc powder of a particle size in the range of about 1 micron to 80 mesh, which powder is susceptible to undesirable caking upon contact with liquids, which method comprises treating said powder with water in an amount in the range of about 0.1 to 2.0% and propylene oxide in an amount in the range of about 1.0 to 2.0% based on the weight of the powder plus water, at a temperature in the range of about 70 to 120° F. and a time in the range of about 1 to 15 days until said powder is sterile, whereby a free-flowing, sterile powder of substantially similar particle size is obtained.

7. A method of claim 6 wherein the amount of water is about 0.5% and the proylene oxide is added as liquid in an amount of about 1.5% and the temperature is about 100° F.

8. A method of claim 7 carried out in an isolated zone impermeable to microorganisms.

References Cited in the file of this patent

UNITED STATES PATENTS

| | | |
|---|---|---|
| 2,075,845 | Gross | Apr. 6, 1937 |
| 2,189,947 | Griffith | Feb. 13, 1940 |

UNITED STATES PATENT OFFICE
CERTIFICATE OF CORRECTION

Patent No. 2,809,879

October 15, 1957

Joseph N. Masci

It is hereby certified that error appears in the printed specification of the above numbered patent requiring correction and that the said Letters Patent should read as corrected below.

Column 1, line 35, after "powder" insert a period; column 3, line 26, between "1.5%" and "3.0%" insert -- 2.0% --; line 29, for "10° F." read -- 100° F. --.

Signed and sealed this 26th day of November 1957.

(SEAL)
Attest:
KARL H. AXLINE
Attesting Officer

ROBERT C. WATSON
Commissioner of Patents